United States Patent [19]

Baker

[11] Patent Number: 4,842,728
[45] Date of Patent: Jun. 27, 1989

[54] CHEMICAL REFORMER

[76] Inventor: David L. Baker, 100 S. Home Ave., Oak Park, Ill. 60302

[21] Appl. No.: 912,222

[22] Filed: Sep. 29, 1986

Related U.S. Application Data

[60] Division of Ser. No. 661,342, Oct. 16, 1984, Pat. No. 4,636,318, which is a continuation-in-part of Ser. No. 622,708, Jun. 20, 1984, abandoned, which is a continuation-in-part of Ser. No. 560,520, Dec. 12, 1983, abandoned.

[51] Int. Cl.$^4$ .................. B01D 17/00; C108 51/00
[52] U.S. Cl. .................... 210/180; 210/182; 210/195.1; 210/251; 202/96; 201/25
[58] Field of Search .......... 201/25, 35; 210/761, 210/180–182, 188, 195.1, 251; 202/96, 108, 150, 262

[56] References Cited

U.S. PATENT DOCUMENTS

| 3,640,340 | 2/1972 | Leonard et al. | 165/166 |
| 3,926,582 | 12/1975 | Powell, Jr. et al. | 201/25 |
| 4,126,519 | 11/1978 | Murray | 201/35 X |
| 4,191,012 | 3/1980 | Stoddard et al. | 210/761 X |
| 4,648,328 | 3/1987 | Keough | 201/25 X |

Primary Examiner—Tom Wyse
Attorney, Agent, or Firm—Garrettson Ellis

[57] ABSTRACT

A method and system of continually reforming sewage and other organic materials into liquid oils and gases by pyrolysis using the contained and entrained water in the inorganic and organic constituents of the sewage.

22 Claims, 5 Drawing Sheets

FIG. I

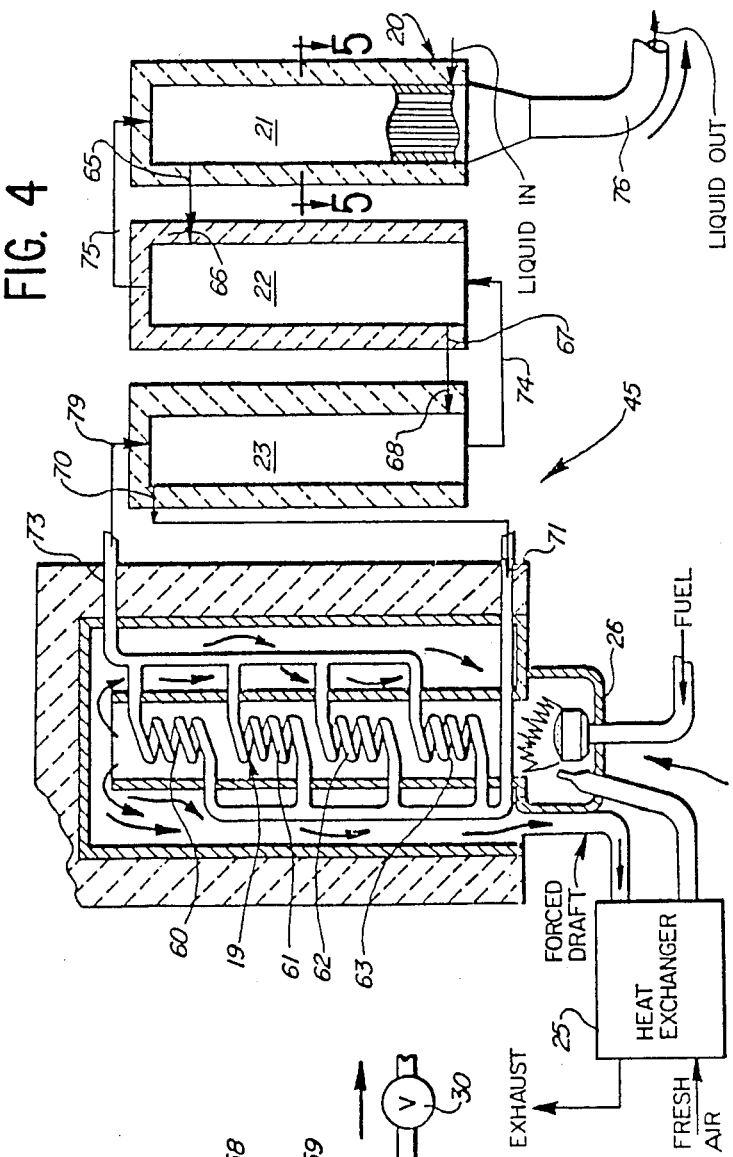

CHEMICAL REFORMER

RELATED APPLICATIONS

This is a division of application Ser. No. 661,342, filed Oct. 16, 1984, U.S. Pat. No. 4,636,318, which is a continuation-in-part of the United States application of David L. Baker, Ser. No. 622,708 filed June 20, 1984, abandoned, which, in turn, is a continuation in part of U.S. application Ser. No. 560,520, filed Dec. 12, 1983, abandoned.

BACKGROUND OF THE PRESENT INVENTION

In the United States alone there are approximately 50,000 tons of semi-dry sewage sludge produced daily in the United States and the treatment, disposal and use of this material presents a major problem to this country on national, state and local levels.

For the most part, sewage sludge has been disposed of after treatment, as opposed to any reformation process producing commercially viable by-products. This disposal includes incineration, landfill, lagooning, stockpiling, ocean-disposition and land-spread. Disposal, however, while commonly practiced, is quite expensive and environmentally dangerous in many applications.

Incineration is generally found uneconomical because of the high cost of incineration and ash disposal equipment and the relatively low net heat yield. Incineration to be productive requires pre-drying the sludge but the equipment costs are exhorbitantly high and the gaseous discharges are unacceptable for most community environments.

There have been a wide variety of purely experimental systems developed for the pyrolysis of sewage sludge, but they have been without exception economically unjustifiable as a method of disposing of the sewage by-products.

One such project involved the experimental conversion of sewage sludge to oil by hydroliquefaction at the Worcester Polytechnic Institute in 1983. These experiments, however, are not acknowledged by applicant to be prior art since applicant's system and process were reduced to practice prior to this work conducted by Wilmer L. Kranich at Worcester Polytechnic Institute, and his experiments are being noted in this background solely for the purpose of acknowledging contemporaneous activity in hydrogenation of sewage sludge and the problems noted in this contemporaneous activity.

In 1983 Mr. Kranich performed hydroliquefaction experiments with sewage sludge using two methods (1) an in situ (batch) hydrogenation on as-received aqueous suspensions of sewage sludge, and (2) the hydrogenation of dried samples in an oil carrier in situ (also a batch experiment). The only special preparation of the as-received raw materials was to stir the raw contents of a sample to obtain an as representative sample as possible. The dried samples were prepared in two ways; the first involved direct low temperature (below 100 degrees C.) drying in a nitrogen atmosphere to avoid oxygenation by air. In the second method the sludge was first dewatered in the laboratory centrifuge and the supernatant discarded before drying. The difference in the results caused by the presence of the dried dissolved salts was not measurable within the limits of accuracy of the experiment. The dried material was ground to a fine powder and slurried in carrier oil in the second method.

In the oil carrier runs, a slurry of dried powdered sludge was dispersed in an anthracine or paraffin oil in a small beaker, warmed to a free-flowing mixture, and with an added catalyst was placed in an autoclave. Hydrogen from an external source under pressure was added to the autoclave until the initial reaction pressure was reached.

This dried sewage sludge was pyrolized at temperatures between 410 to 440 degrees C. with reaction times of 10 to 20 minutes in oil slurries.

The oil and gas content of the yields from Mr. Kranich's hydrogenation process was inconsistent and inclusive, because the amount of carrier oil lost in his calculations by conversion to gas resulted in a calculated yield greater than the total amount of dry sludge converted, acknowledged by Mr. Kranich to be "an impossible result".

As an alternative to immersing the sewage sludge in an oil carrier, Mr. Kranich also attempted batch pyrolysis with sewage sludge using a water-sewage sludge slurry without the addition of any carrier oil. He hypothesized that the pyrolysis of this slurry would produce hydrogen that ideally may produce hexane $C_6H_{14}$ but his experiments were a total failure in that no such results occurred. Again the entire hypothesis of Mr. Kranich's experiment was the addition of externally stored hydrogen.

Mr. Kranich concluded, based upon his experiments, that the conversion of dried sludge slurried in oil was not economically feasible in view of the large equipment and operating costs for pre-drying the sludge and therefore his subsequent experiments were directed to batch testing a water slurried sewage sludge without any oil carrier whatsoever. The results of these latter experiments did not indicate any significant hydrogenation because of the low temperature limitation, i.e. around 300 degrees C., imposed by the large amounts of carrier water.

It is a primary object of the present invention to ameliorate the problems noted above in the conversion of sewage sludge to oil. Also, the invention may be used to process a large variety of other organic waste products to generate oils and burnable gases.

SUMMARY OF THE PRESENT INVENTION

According to the present invention a method and system are provided for continuously reforming sewage or other organic materials into liquid oil, gases and other commercially useful by-products by pyrolysis in the presence of water, preferably at least about 10 weight percent of water, and typically 30, 40, or more weight percent water. This process typically uses an energy efficient reactor that elevates the temperature of an oil-based carrier and organic material such as undried sewage sludge mixture to the desired temperature, typically 700° to 950° F., for example 840° to 880° F., while controlling system pressure as desired, typically to a value of 700 to 2500 psi. Without wishing to be limited to any particular theory of operation of this invention, superheated steam produced by heating appears to react with the sewage sludge and products thereof. This apparently results in improved hydrogen production over prior known reactions, and often appears sufficient to cause substantially complete hydrogenation of the organic constituents in the sewage sludge or other organic waste products without requiring any external addition of hydrogen.

In another aspect of this invention, a continuous flow reactor is used in which the oil carrier-sewage sludge mixture after reaching its maximum temperature is passed into out-of-contact heat exchange relation with incoming mixture to pre-heat the incoming mixture by heat transfer, resulting in the output from the reactor being preferably not significantly above ambient temperature.

Toward this end the reactor includes one or more vertical pass counterflow exchange sections with incoming mixture passing vertically upwardly or downwardly through vertical baffles in out-of-contact heat exchange relation with hotter outgoing liquid mixture.

Another feature of the present invention is the provision of a mechanical exchanger that is a piston and cylinder device that transfers in impulse fashion incoming mixture to the reactor and reformed mixture from the reactor to subsequent separation stages.

In summary, one mixes an oil-based carrier with organic waste material, the waste material being undried, typically containing at least about 10 weight percent water and optionally much higher water quantities such as 40 to 60 percent or more. The amount of oil-based carrier present is sufficient to permit the mixture to be a more readily flowable material than the corresponding waste material free of oil carrier. One then pyrolyzes the flowable material at elevated temperature and pressure, to produce organic oils and gases in accordance with this invention. The oil-based carrier may be a hydrocarbon oil, for example heating oil.

The flowable material is preferably passed in a substantially continuous stream through a heating and pressurizing zone to produce liquid oils in the resulting heated, substantially continous stream. Thereafter, the heated, substantially continuous stream is passed through heat exchange means to recover heat and to transfer it to the substantially continuous stream prior to entry into the heating and pressurizing zone. Thus the operation achieves a great efficiency, despite the fact that high temperatures may be used. The heat of the system may be recycled, and thus relatively little heat is wasted.

It is typically desirable for the readily flowable material, particularly when it is a municipal waste product such as sewage sludge, to be pyrolyzed at a temperature of 700° to 950° F. and at a pressure of 700 to 2500 psi. The readily flowable material preferably contains from 60 to 90 weight percent of the oil carrier prior to pyrolysis.

For example, the readily flowable material containing the organic waste products may be exposed to pyrolysis at 750° to 900° F. and at a pressure of 800 to 1500 psi. for an average period of time exceeding 5 minutes in a continuous process. This average period of time is determined by simple average flow calculation, since material is constantly entering and exiting the pyrolysis zone.

As the result of this, organic waste products that have long caused environmental difficulties can be turned into useful oils and gases that may be burned for energy, or which may serve as lubricants, ingredients in other products, or chemical intermediates. For example, organic garbage or waste paper may be processed. Surprisingly, much of the oils produced turn out to be hydrocarbons free of oxygen groups, and comparable to petroleum products. Also, the end product can be mostly oils, with little gas generation.

BRIEF DESCRIPTION OF THE DRAWINGS

FIG. 3 is a fragmentary cross section of one of the pressure control devices for maintaining system pressure, illustrated schematically in FIG. 1.

FIG. 4 is a partly fragmented view of a reactor illustrated schematically in FIG. 1 with its heater shown in cross section along with its three heat exchange sections.

DETAILED DESCRIPTION OF THE PREFERRED EMBODIMENTS

Sewage sludge varies significantly from community to community across the country but digested sludge usually contains the following components: oils, 2 to 5%; asphaltenes, 2 to 4%; organic toluene-insolubles, 25 to 40%; ash 7 to 15%; and water 40 to 50%. An important aspect of the present invention is that the sewage sludge does not have to be dried from the above values prior to chemical reformation by pyrolysis.

Figure 1:
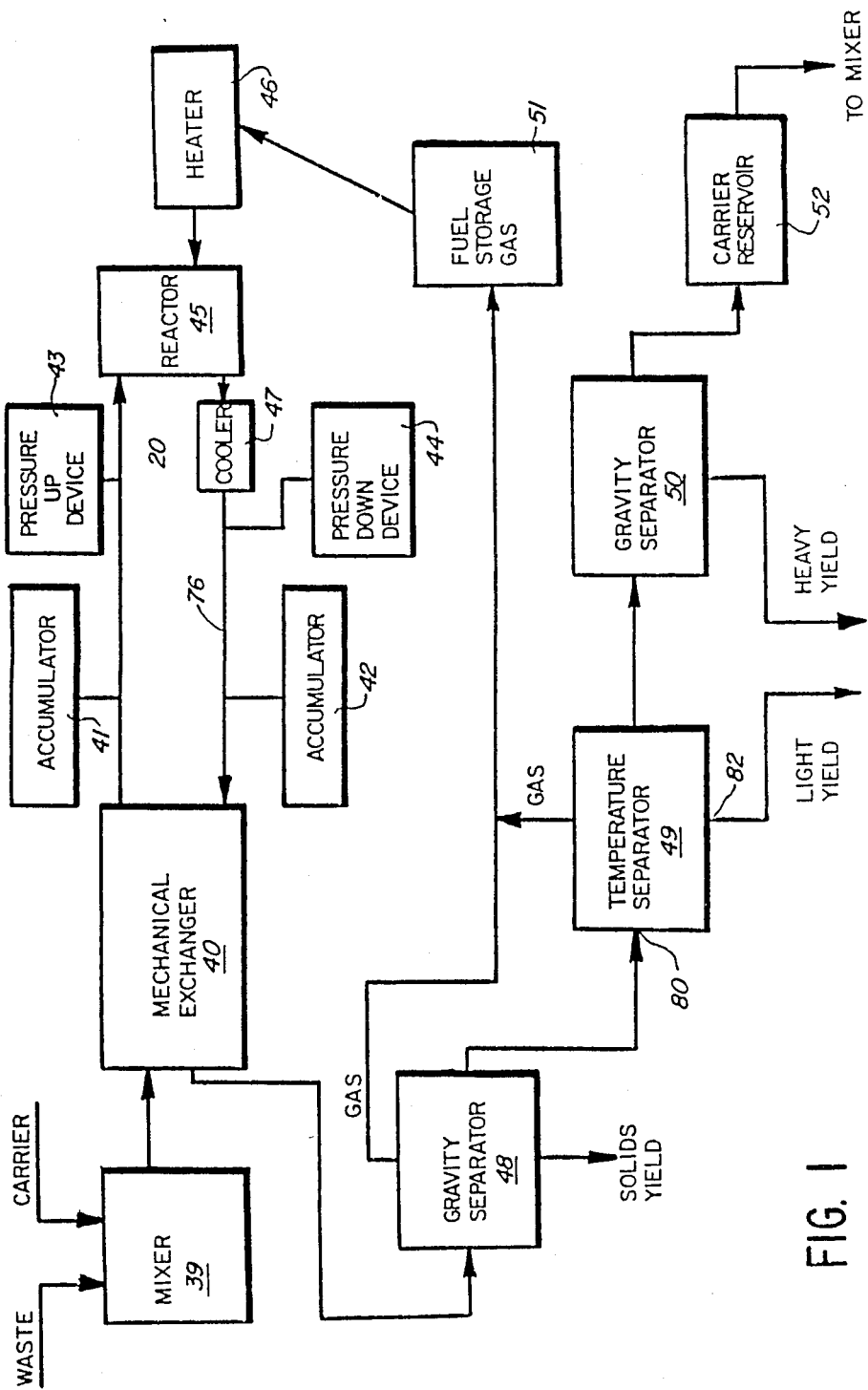
FIG. 1 is a schematic flow diagram of a present organic material reforming system.

Viewing FIG. 1, where the present system is shown schematically, mixer 39 mixes undried sewage sludge with an oil carrier as necessary, which may be essentially recirculated yield produced by the system. Of course, a system start-up carrier oil may be provided for initial start-up. Mechanical exchanger 40 both adds and withdraws equal volumes of the sewage sludge-carrier oil to and from reactor 45, taking fresh material from mixer 29 and conveying such material to reactor 45 in continuous but pulsating fashion. The accumulator 41 reduces the transient pressures produced by the pulsating action of the exchanger 40. Pressure up device 43 is a piston and cylinder device that regulates input pressure to reactor 45 at a desired level, typically less than 2000 psi.

In the reactor 45, the sewage sludge-carrier oil mixture is typically heated to approximately 840 to 880 degrees F. to produce the pyrolytic conversion of the organic constituents in the sewage sludge to oil and gas, apparently by hydrogenation in addition to the further reformation by hydrogenation of the carrier oil. In the reactor 45 the water changes to superheated steam, apparently providing an improved water/gas reaction with partial shift that provides hydrogen for the hydrogenation process.

Reactor 45 delivers its output to counterflow heat exchangers 21–23 (FIG. 4) that provide an output having a temperature only slighly above ambient. Cooler 47 acts as a safety device to reduce reactor outlet temperatures to avoid the excessive production of gases, and may be of conventional design, such as a chamber of cooling liquid through which flow channel or outlet pipe 76 passes. Pressure-down device 44 is a pressure regulator identical to pressure regulator 43 to regulate the outlet pressure from reactor 45. Accumulator 42 smooths the pulsating flow.

Mechanical exchanger 40 also receives reformed carrier oil-sewage sludge mixture from the reactor and transfersit to gravity separator 48, that separates remaining produced gases and solid yields consisting mostly of tar. The gravity separator is a spiral separator of conventional design, not shown in detail in the drawings, wherein liquid enters the outside and flows in a circular route to the center. During this period free gases collect at the top and are drawn off continously. Solids settle at the bottom and are removed periodically. Fluid from the center flows continuosly out to temperature separator 49. Temperature separator 49 essentially produces the separation of lighter oils from the reformed mixture, and further separates any remaining gaseous components as yield which combines with the also volatile gaseous components from gravity separator 48, for delivery to a fuel storage reservoir 51, which may provide a fuel source for heater 46 or for other fuel purposes.

Gravity separator 50 of conventional design receives the heavier mixture components from temperature separator 49 and includes a spiral separator wherein flow enters from the outside and circles to the middle. The heavier oil and residue is drawn off the bottom, while the lighter yield from the top center is taken off as carrier to a carrier reservoir 52 from where it is recirculated to the mixer 39 as carrier oil liquid.

Figure 2:
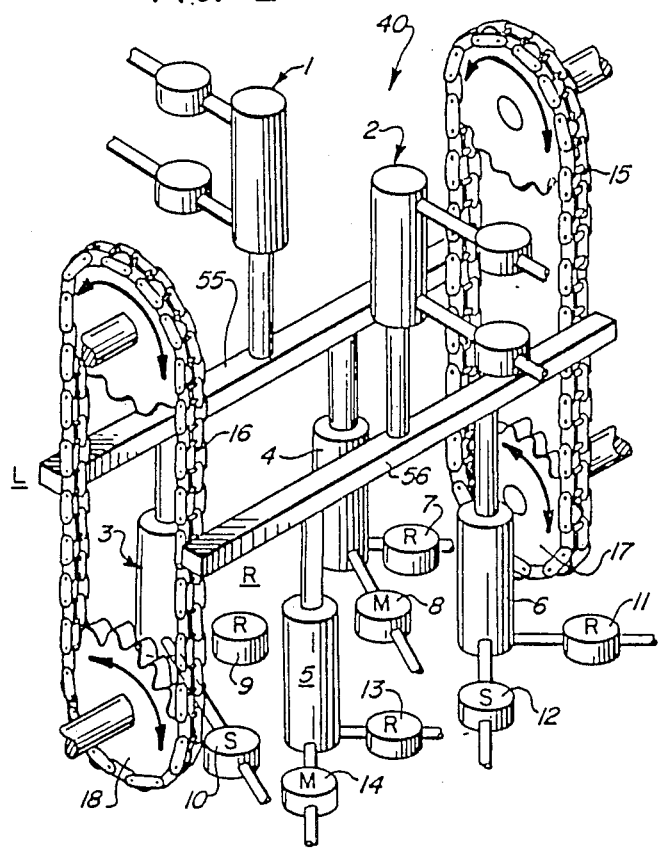
FIG. 2 is a perspective view of a mechanical exchanger illustrated schematically in FIG. 1.

The mechanical exchanger 40 illustrated in FIG. 2 is seen to include four piston and cylinder devices 3, 4, 5 and 6 having stationary cylinders and movable headless pistons or plungers driven in reciprocation by hydraulic cylinders 1 and 2 connected to the piston and cylinder devices 3, 4, 5 and 6 by bars 55 and 56. The bars 55 and 56 are connected at their ends to synchronizing chains 15 and 16 which assure 180 degree out-of-phase movement of cylinders 3 and 4 with respect to cylinders 5 and 6.

Cylinders 4 and 5 are connected to draw oil carrier-sewage sludge mixture from mixer 39 and deliver it to reactor 45, while cylinders 3 and 6 are connected to withdraw reformed mixture from reactor 45 and deliver it to gravity separator 48. Valves 7 and 13 are connected to the reactor inlet line and valves 9 and 11 are connected to the reactor outlet line. Valves 8 and 14 are connected to mixer 39 while valves 10 and 12 are connected to gravity separator 48.

When cylinder 1 extends and cylinder 2 retracts, bar 55 goes down and bar 56 goes up, and the following sequence results: Mixture in cylinder 4 is conveyed to the reactor through valve 7; mixture from the reactor is drawn into cylinder 6; mixture from the mixer 39 is drawn into cylinder 5; and reformed mixture in cylinder 3 is delivered to the gravity separator 48. On the reverse stroke with piston 2 extending and piston 1 retracting the following sequence occurs with cylinders 3 and 4 retracting and cylinders 5 and 6 extending: Mixture from mixer 39 is drawn into cylinder 4; reformed mixture in cylinder 6 is conveyed through valve 12 to gravity separator 48; mixture in cylinder 5 is conveyed to the reactor through valve 13; and reformed mixture is drawn into cylinder 3 from the reactor through valve 9.

The mechanical exchanger 40 allows an exchange of liquid mixture with reactor 45 without a volume change in the reactor 45. Because of this a minimum of horsepower is required to pass a given amount of liquid through the system.

The speed-up of the operation is easy to regulate with exchanger 40, and thus the amount of flow readily varies as required. The system valves 7, 8, 9, 10, 11, 12, 13 and 14 are automatically externally operated and are fully opened to reduce the abrasive effects of the passing mixture. If cylinders 3, 4, 5 and 6 include four two-inch rods with a 24-inch stroke at a 13-second cycle rate at a pressure of 1200 psi. and one-half horsepower motor driving a hydraulic pump, a 180 gallons per hour flow rate will be achieved. This is about one-sixth the horsepower required for a one-end-in/one-end-out operation.

Referring to FIG. 3 wherein the pressure up device 43 is shown in detail, it is seen to include a hydraulic cylinder 26 controlled by system pressure at the inlet to reactor 45. Cylinder 45 is connected to an accumulator cylinder 58 in which a piston 59 is reciprocably mounted on rod 60 driven by cylinder 26. The limits of movement of rod 60 and piston 59 are controlled by limit switches 27 and 28. When system pressure in reactor 45 falls below a predetermined value, e.g. 1000 psi., cylinder 26 will respond by moving piston 59 upwardly in cylinder 58, opening one-way valve 29 and filling cylinder 58. Cylinder 26 automatically reverses upon actuation of switch 27, causing piston 59 to travel downwardly in cylinder 58, causing one-way valve 30 to open which results in an increase in system pressure.

As seen in FIG. 4, the reactor 45 and heater 46 consist of a heat exchanger 25, a heater section 19 and three identical vertical dual pass heat exchangers 21, 22 and 23. The heat exchanger 25 is a counterflow plate heat exchanger with a constant rate of air flow, determined by a blower through a heater box containing heater 19, whose four coils 60, 61, 62 and 63 transfer heat to the carrier oil-sewage sludge mixture passing through them. Heat is supplied by a burner 26 and start-up is supplied by electric heater rods. The air may be circulated at approximately 1000 degrees F. depending upon the rate of flow and the chemical load.

Mixture enters heat exchanger 21 from mechanical exchanger 40 at inlet 20, and then this mix passes upwardly in one pass of heat exchanger 21 to the top and then through outlet 65 to inlet 66 of heat exchanger 22 where it passes down to the bottom in one pass and exits at 67 to inlet 68 of exchanger 23. Mixture at inlet 68 passes up one pass in exchanger 23 to the top where it exits at 70, entering heater section inlet at 71 where it passes in parallel fashion through coil sections 60, 61, 62 and 63. Mixture at maximum temperature exits heater 19 at outlet 73 and enters inlet 79 of exchanger 23 from where it flows downwardly in out-of-contact heat exchange relation from inbound liquid. After pre-heating inbound liquid in exchanger 23, outbound mixture enters the lower end of exchanger 22 via line 74 and passes in out-of-contact heat exchange relation with inbound fluid therein. Thereafter the outbound liquid enters the top of exchanger 21 via line 75 and passes in out-of-contact heat exchange relation therewith and exits the reactor through outlet pipe 76 connected to return to mechanical exchanger 40.

Figure 5:
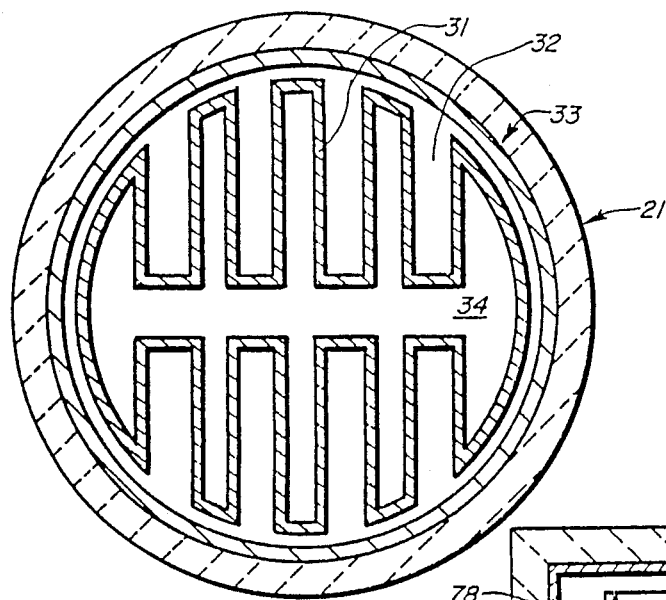
FIG. 5 is a cross section of one of the reactor heat exchange sections illustrated in FIG. 4 taken generally along line 5—5 therein.

FIG. 5 shows a cross section of each of the heat exchangers 21, 22 and 23 illustrated in FIG. 4. Each is seen to consist of a housing 33 and a separator 31 which divides the volume into two passes 32 and 34. Pass 32 is the inbound pass going from mechanical exchanger 40 to heater 19, and pass 34 is the outbound flow going from heater 19 to cooler 47. The corrugated shape of separator 33 gives a maximum of heat exchange area.

If system pressure due to an increased volume created by chemical reaction from the reactor 45 is too high, the pressure down device 44 will operate. Pressure down device 44 is identical to pressure up device 43 illustrated in FIG. 3. When the pressure down device 44 senses an increase in outlet pressure from reactor 45, the pressure down device will retract, withdrawing fluid from reactor 45, decreasing reactor pressure, and then will extend delivering the withdrawn fluid to the mechanical exchanger without imposing any backloading on the reactor 45 because of the effects of the check valves in the pressure down device 44, corresponding to the valves 29 and 30 in the pressure up device illustrated in FIG. 3.

Figure 6:
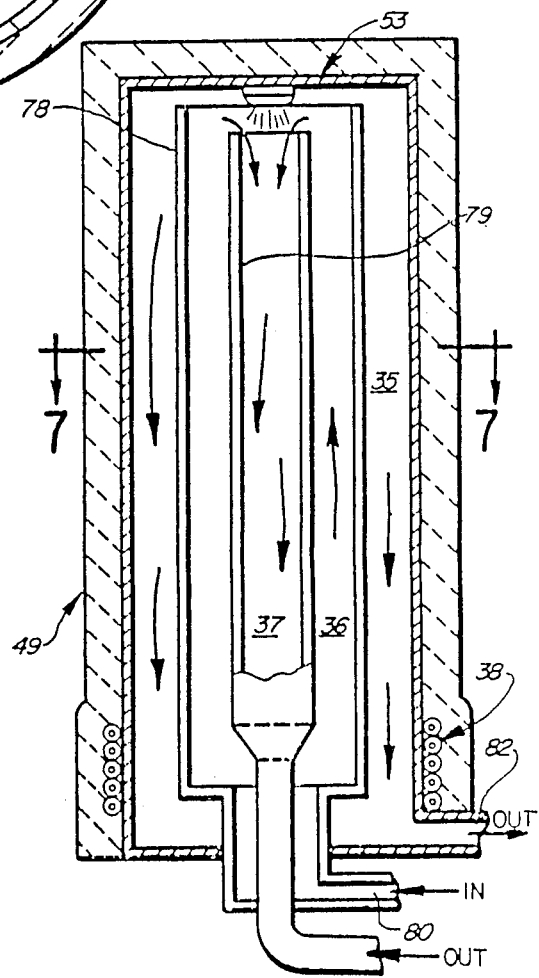
FIG. 6 is a longitudinal section of a temperature separator illustrated schematically in FIG. 1.
Figure 7:
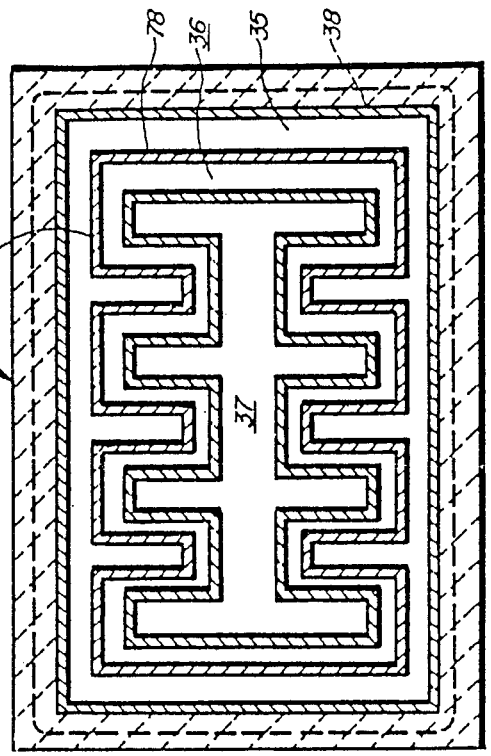
FIG. 7 is a cross section of the temperature separator taken generally along 7—7 of FIG. 6.

The temperature separator 49 is illustrated in FIGS. 6 and 7 and is seen to consist of three passes 35, 36 and 37 defined by spaced baffles 78 and 79, a heat source 53 and a cold plate area 38. Liquid enters inlet 80, seen in FIG. 6 and flows upwardly in pass 36 to the top, picking up heat as it flows, and at the top the flow of liquid descends in pass 37 since baffle 79 is shorter than outer baffle 78. The heat absorbed on the way up and at the top is exchanged to the upward flow in pass 36. At the top a temperature of typically 400 degrees F. is maintained by heater 53 which will vaporize the light ends of the oil yield which descend in pass 35, also giving up heat to inbound liquid flowing upwardly in pass 36 and condensing the remainder in the cold plate area 38.

Light yield flow from outlet 82 goes to a light yield storage, to be used as one of the main by-products of this system.

Figure 8:
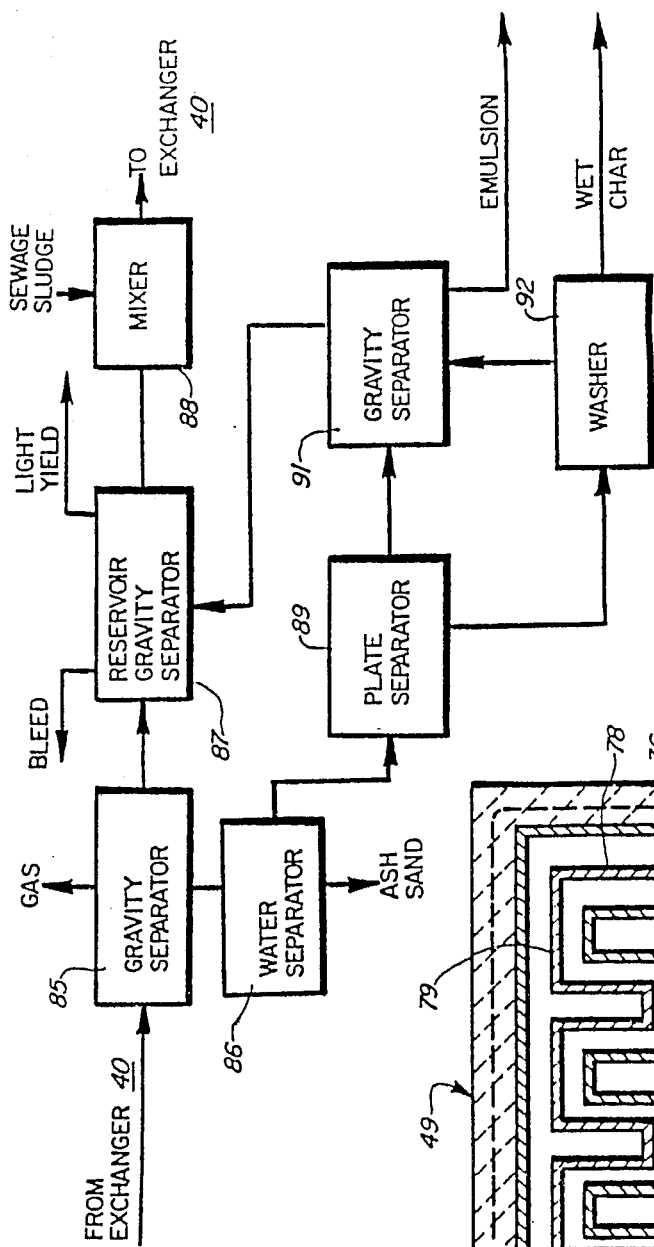
FIG. 8 is a schematic flow diagram of a modified form of the present invention including an improved separator system for separating the reformed mixture's constituent components.

In FIG. 8, I show a schematic diagram of another embodiment of the separator portion of the system illustrated in FIG. 1. Gravity separator 85 is a spiral gravity separator and receives reformed liquid from mechanical exchanger 40 and separates free gases at the top as a yield product. The solids at the bottom of separator 85 containing oil, char, sand, ash and emulsion are passed to water separator 86. The carrier mixture from the top of separator 85 contains about 5% char which can be used to take up with any excess water in the input material, and is passed to reservoir gravity separator 87. The gravity separator 87 contains a reservoir section that permits the increase in system volume produced through chemical reformation to be bled off in order to assist in maintaining system pressure. As the inventory builds up in the gravity separator 87 it can be removed and sent to a temperature separator (not shown) to separate the light ends for fuel. The lower carrier in the separator 87 is the heavier oil and will contain some char. This heavier carrier is passed through mixer 88 and permits the heavier oils to be recirculated as carrier and reformed to shorter molecules in the reactor 45, which of course is desirable.

The mixer 88 is a mechanical mixer and mixes the carrier in proper proportion to the input raw sewage sludge.

The water separator 86 agitates the solids from gravity separator 85 gently with water, resulting in sand and ash going to the bottom. The char in emulsion entrained in oil will float off the top and the exiting mixture to plate separator 89 contains about 5 to 10% char and 1 to 2% emulsion by volume.

The plate separator 89 is a gravity plate separator with horizontal flow across perforated plates which causes any particle falling through the plate to drop into a non-flowing zone that is pitched so these particles dropping undisturbed to the bottom may be removed through a water level. The resulting carrier from plate separator 89 contains only a small percentage of emulsion and is conveyed to gravity separator 91. The concentrate from separator 89 is char saturated with carrier and emulsion and exits the lower end of separator 89 to washer 92.

The gravity separator 91 is a spiral baffle gravity separator that separates the carrier and emulsion which is heavier than the carrier but lighter than water. The clean carrier from washer 92 is also delivered to the input of gravity separator 91 since it will continue to have a small amount of emulsion. The carrier free of char and emulsions flows from the reservoir of gravity separator 91 to the gravity separator 87 as additional carrier oil. The emulsion from gravity separator 91 is removed as yield.

The washer 92 is an intensive agitator which replaces the oil bound around the char with water, at which time it sinks in the water. The wet char is removed from washer 92 and can be conveyed to mixer 88 to be reformed to oil by pyrolysis.

Parts of the apparatus described above which are not described in detail herein may be manufactured and used in accordance with conventional technology known to those skilled in the art of hydraulic and chemical process equipment.

Accordingly, organic waste products, particularly municipal wastes such as undried sewage sludge, can be turned into a useful source of energy in the form of oils and burnable gases. The products of the process of this invention are also useful for other industrial purposes.

The above has been offered for illustrative purposes only, and is not intended to limit the scope of the invention of this application, which is as defined in the claims below.

That which is claimed is:

1. A system for pyrolyzing sewage or other organic material comprising: a mixer for combining the organic material with an oil-based carrier, means for supplying an oil-based carrier to the mixer, a reactor for receiving the combined organic material and carrier mixture from the mixer and pyrolyzing the combined mixture, flow conduit means communicating between the mixer and reactor, said reactor including a temperature elevation zone having an inlet and an outlet, said reactor including a regeneration zone for passing the elevated temperature mixture from the outlet of the temperature elevation zone in out-of-contact heat exchange relation with the incoming mixture from the temperature elevation zone inlet, means for separating resulting yield oil or gas from the pyrolyzed mixture, and means for returning at least a portion of the pyrolyzed mixture to the mixer as oil-based carrier.

2. A system for pyrolyzing sewage and other organic material as defined in claim 1, wherein the reactor temperature elevation zone includes a vertically upward pass, said regeneration zone including a vertically downward pass directly adjacent and in out-of-contact heat exchange relation with the vertically upward pass.

3. A system for pyrolyzing sewage or other organic material as defined in claim 1, including a mechanical exchanger connected between the mixer and reactor for conveying the sewage-carrier mixture from the mixer to the reactor, said exchanger including at least one reciprocating piston device.

4. In apparatus for producing useful oils and gases from raw materials:

means for mixing said raw materials with a carrier oil;
constant volume mechanical exchanger means comprising first and second volume displacement means;
a reactor conduit having upstream and downstream ends;
means for heating and pressurizing fluid in said reactor conduit;
heat exchange means associated with said reactor conduit, said heat exchange means causing heat to flow from heated fluid in downstream portions of the reactor conduit to less heated fluid in upstream portions of the reactor conduit;
a first conduit communicating between the mixing means and the first volume displacement means;
a second conduit communicating between the first volume displacement means and the upstream end of said reactor conduit;
a third conduit communicating between the downstream end of the reactor conduit and the second volume displacement means;
a fourth conduit communicating between the second volume displacement means and means for separating components of fluid emitted through said fourth conduit; and
means for causing said first and second volume displacement means to operate in 180 degree out-of-phase movement, plus valve means directing flow from said first volume displacement means through said reactor conduit to said second volume displacement means, whereby substantially constant volume flow into and out of said reactor conduit takes place.

5. The apparatus of claim 4 in which each of said first and second volume displacement means comprises a pair of displacement rods and cylinders, and means to cause individual displacement rods and cylinders of each pair to operate in 180° out-of-phase movement, whereby substantially constant flow at substantially constant volume takes place into and out of said reactor conduit.

6. The apparatus of claim 4 in which each displacement rod of said first and second piston and cylinder means is headless.

7. The apparatus of claim 4 in which said heat exchange means is of the counter current flow type and defines a convoluted heat exchange wall separating upstream and downstream portions of said reactor conduit.

8. The apparatus of claim 4 in which said heat exchange means is of countercurrent flow type and comprises a convoluted heat exchange wall proportioned to define said downstream portions of the reactor conduit on one side of said convoluted heat exchange wall and said upstream portions of the reactor conduit on the other side of said heat exchange wall, said convoluted heat exchange wall being enclosed within a tubular housing capable of withstanding high fluid pressures in both said upstream and downstream portions of the reactor conduit.

9. In chemical reforming apparatus, means for mixing raw materials to be reformed with a carrier oil to form a flowable mixture;
constant volume mechanical exchanger means comprising at least first and second chamber means, plus means for varying the volume of each of said first and second chamber means;
a reactor conduit having upstream and downstream ends;
means for heating and pressurizing fluid in said reactor conduit;
heat exchange means, associated with said reactor conduit, said heat exchange means causing heat to flow from heated fluid in downstream portions of the reactor conduit to less heated fluid in upstream portions of the reactor conduit;
a first conduit communicating between the mixing means and said first chamber means;
a second conduit communicating between the first chamber means and the upstream end of the reactor conduit;
a third conduit communicating between the downstream end of the reactor conduit and the second chamber means;
a fourth conduit communicating between the second chamber means and means for separating components of fluid emitted through said fourth conduit;
means for causing said volume varying means in the first and second chamber means to operate in essentially 180 degree out-of-phase movement to expand the volume of one chamber while reducing the volume of the other chamber and visa versa, and one way valve means to permit one way flow through said first and second chambers, whereby substantially constant volume flow into and out of said reactor conduit takes place.

10. The apparatus of claim 9 in which said heat exchange means is of the countercurrent flow type and defines a convoluted heat exchange wall separating upstream and downstream portions of said reactor conduit to permit heat exchange between said upstream and downstream portions.

11. The apparatus of claim 10 in which said means for varying the volume in said chamber means comprise rods advanceable into and retractable out of the respective first and second chamber means while being spaced from the wall of said chamber means except at a sealed entry site.

12. The apparatus of claim 11 in which said first and second chamber means are respectively each a pair of cylinders having respectively said rods operable therein, said cylinders of each pair of chamber means being connected in parallel flow circuit relation to each other, and means to cause individual rods and cylinders of each pair to operate in 180 degree out-of-phase movement, whereby substantially constant flow at substantially constant volume takes place into and out of said reactor conduit.

13. The apparatus of claim 10 in which said convoluted heat exchange wall is enclosed in a tubular housing capable of withstanding high fluid pressures.

14. The apparatus of claim 13 in which said means for heating the fluid in the reactor conduit comprises means for forcing heated air to flow in a flow path which extends generally longitudinally along at least a portion of said reactor conduit in generally countercurrent flow relation thereto.

15. The apparatus of claim 14 in which means are provided for passing said flowing, heated air after it is passed longitudinally along said portion of the reactor conduit into air heat exchange means whereby said flowing air enters into heat exchange relation with incoming air to transfer heat from said flowing air to the incoming air for energy saving purposes.

16. In chemical reforming apparatus, means for mixing raw materials to be reformed with a carrier oil to form a flowable mixture;
   a reactor conduit having upstream and downstream ends;
   means for passing said flowable mixture into the upstream end of the reactor conduit for passing fluid therethrough;
   means for heating and pressurizing fluid in said reactor conduit;
   heat exchange means for causing heat to flow from heated fluid in downstream portions of the reactor conduit to less heated fluid in upstream portions of the reactor conduit, said heat exchange means comprising a convoluted heat exchange wall proportioned to define said downstream portions of the reactor conduit on one side of said convoluted heat exchange wall and said upstream portions of the reactor conduit on the other side of said heat exchange wall, said convoluted heat exchange wall being enclosed within a tubular housing capable of withstanding high fluid pressures in both said upstream and downstream portions of the reactor conduit.

17. The apparatus of claim 16 including means for providing substantially constant volume flow of said raw materials mixed with the carrier oil into and out of said reactor conduit with the pressure and temperature of fluid in said reactor conduit being elevated.

18. The apparatus of claim 17 in which said means for heating and pressurizing fluid in said reactor conduit comprises means for heating the reactor conduit between the upstream portion and downstream portion, said constant volume flow providing means comprising a first chamber communicating with the upstream end of the reactor conduit and a second chamber communicating with the downstream end of the reactor conduit, and means for alternatingly increasing and decreasing the volume of said first and second chambers in which the volume increasing and decreasing pattern of the first chamber is substantially 180 degrees out-of-phase to the pattern of increasing and decreasing said volume of the second chamber, whereby substantially constant volume flow into and out of said reactor conduit takes place.

19. The apparatus of claim 16 in which said means for heating the fluid in the reactor conduit comprises means for forcing heated air to flow in a flow path which extends generally longitudinally along at least a portion of said reactor conduit in generally countercurrent flow relation thereto.

20. The apparatus of claim 19 in which means are provided for passing said flowing heated air after it has passed longitudinally along said portion of the reactor conduit into air heat exchange means whereby said flowing air enters into heat exchange relation with incoming air to transfer heat from said flowing air to the incoming air for energy saving purposes.

21. A system for pyrolyzing organic material comprising: a mixer for combining the organic material with an oil-based carrier, means for supplying an oil-based carrier to the mixer, a reactor having an inlet for receiving the combined organic material and carrier mixture from the mixer and pyrolyzing the combined mixture, said reactor including a temperature elevation zone having an inlet and an outlet, said reactor including a regeneration zone ending in a reactor outlet, for passing the elevated temperature mixture from the outlet of the temperature elevation zone in out-of-contact heat exchange relation with incoming mixture from the temperature elevation zone inlet, and means for separating resulting yield oil or gas from the pyrolyzed mixture, said system including an exchanger connecting the mixer and reactor for supplying combined organic material and carrier mixture to and from the reactor in equal quantities, said exchanger comprising first and second chamber means, plus means for varying the volume of each of said first and second chamber means, said first chamber means being connected to the reactor inlet and said second chamber being connected to the reactor outlet, and means for causing said volume varying means of the first and second chamber means to operate in essentially 180 degree out-of-phase movement to expand the volume of one chamber while reducing the volume of the other chamber and vice versa, and one way valve means to permit one way flow through said first and second chambers, whereby unprocessed organic material and carrier mixture from the mixer enters the reactor inlet in quantities equal to processed organic material and carrier mixture leaving the outlet of the reactor 22. The system of claim 21 including means for returning at least a portion of the remaining pyrolyzed mixture, minus removed yield oil or gas, from the system, to the mixer as oil-based carrier.

* * * * *